United States Patent [19]

Hilbert et al.

[11] Patent Number: 4,598,142
[45] Date of Patent: Jul. 1, 1986

[54] COPOLYESTER ADHESIVES

[75] Inventors: Samuel D. Hilbert, Jonesborough; Richard L. McConnell, Kingsport, both of Tenn.

[73] Assignee: Eastman Kodak Company, Rochester, N.Y.

[21] Appl. No.: 727,983

[22] Filed: Apr. 29, 1985

[51] Int. Cl.$^4$ .................. C08G 63/68; C08G 75/00
[52] U.S. Cl. .................................. 528/295; 528/302
[58] Field of Search ............................. 528/295, 302

[56] References Cited

U.S. PATENT DOCUMENTS

| | | | |
|---|---|---|---|
| 4,257,928 | 3/1981 | Vaciton et al. | 528/295 X |
| 4,427,557 | 1/1984 | Stockburger | 528/295 X |
| 4,439,482 | 3/1984 | Suematsu | 528/295 X |
| 4,480,085 | 10/1984 | Larson | 528/295 |
| 4,499,262 | 2/1985 | Fagerburg et al. | 528/295 X |

Primary Examiner—Lucille M. Phynes
Attorney, Agent, or Firm—John F. Stevens; William P. Heath, Jr.

[57] ABSTRACT

Disclosed are copolyester adhesives containing small amounts of at least one difunctional sulfonate metal salt such as 5-sodiosulfoisophthalate. Such copolyesters permit a wider bonding temperature range with fabrics and provide increased bond strengths on metal substrates.

7 Claims, No Drawings

COPOLYESTER ADHESIVES

TECHNICAL FIELD

This invention relates generally to copolyester adhesives, and more specifically to copolyester adhesives containing about 0.2 to about 6 mol % of a difunctional sulfonate metal salt.

BACKGROUND OF THE INVENTION

Commercial polyester adhesives are available which can be used for bonding fabrics and metals. It would be advantageous to be able to broaden the temperature range at which bonds can be made with these adhesives and still allow good bond strengths to be obtained. It would also be advantageous to be able to increase the strength of bonds made with these adhesives on metal substrates. It has now been found that certain low-melting, thermoplastic copolyesters containing small amounts of dimethyl 5-sodiosulfoisophthalate or related difunctional sulfonate metal salts allow the use of a wider bonding temperature range with fabrics and also provide increased bond strengths on metal substrates.

Patents of interest which disclose polyesters and polyesteramides containing sulfonate groups in the form of a metallic salt and at least 15 mol % of at least one glycol). include U.S. Pat. Nos. 4,233,196, 3,734,874 and 3,779,993. In general, these patents disclose compositions derived from a metal sulfonate group attached to an aromatic nucleus wherein the functional groups are hydroxyl, carboxyl, or amino. These polymers are used primarily as water-dispersible sizes for fibers.

U.S. Pat. No. 4,104,262 relates to a water-dispersible polycondensation polyester resin having moieties of at least one polycarboxylic acid and at least one polyvalent alcohol of the terminal hydroxyl groups, said polyester having a molecular weight between 300 and 3,000, a softening point between 30° and 60° C. wherein said polyester additionally contains an amount of 1 to 5 mol percent, based upon the moieties of polycarboxylic acids or polyvalent alcohols, moieties of an alkali metal-sulfo group containing polycarboxylic acid or polyvalent alcohol. U.S. Pat. No. 4,499,262 relates to a process for producing sulfo-modified polyesters using a particular catalyst system. The process comprises the steps of (a) reacting under polyester forming conditions
  (1) a 100 mol % dicarboxylic acid component comprising at least about 85 mol % terephthalic acid or an ester-forming derivative thereof and about 0.1 to about 5.0 mol % of a difunctional sulfo-monomer containing at least one metal sulfonate group attached to an aromatic nucleus, wherein the functional groups are hydroxyalkoxy, carboxyl, or amino,
  (2) a 100 mol % glycol component comprising at least about 85 mol % ethylene glycol.

U.S. Pat. No. 3,634,541 relates to polyester comprising, in addition to the usual dicarboxylic acid moiety and diol moiety, definite amounts of araliphatic sulfonate radicals of the general formula

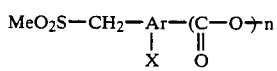

in which
Me stands for alkali metal,
Ar represents the benzene nucleus
X stands for hydrogen, methyl or the group MeO₂S—CH₂— and
n is 1 or 2 in the polymer molecule. The polyesters and the shaped structures made therefrom have a good affinity for basic dyestuffs and the dyeings obtained are very fast to light.

DESCRIPTION OF THE INVENTION

In accordance with the present invention, there are provided crystalline copolyester adhesive compositions in which the copolyester is derived from at least four components, one of which is a difunctional sulfonate metal salt in a relatively low amount (mol %). Also, the copolyester has an I.V. of about 0.4–1.2. The lower limit of I.V., 0.4, is equivalent to a molecular weight (number average) of at least 5,000 as measured by hydroxyl numbers and carboxyl numbers. Molecular weights below about 5,000 tend to be too brittle with low bond strengths to be useful as adhesives.

The copolyester of the present invention has repeat units from the following:
(a) about 0.2–6 mol % of at least one difunctional sulfomonomer containing at least one metal sulfonate group attached to an aromatic nucleus wherein the functional groups are hydroxy or carboxy.
(b) at least one dicarboxcylic acid selected from the group consisting of aliphatic, alicyclic or aromatic dicarboxylic acids having 2–20 carbon atoms,
(c) at least one glycol selected from the group consisting of aliphatic, or alicyclic glycols having 2–12 carbon atoms,
(d) at least one dicarboxylic acid different from (a) or (b), having 2–20 carbon atoms, or at least one glycol different from (a) or (c) having 2–12 carbon atoms, wherein the acid and glycol components total 100 mol % each, and the copolyester has an I.V. of about 0.4–1.2, a heat of fusion of less than 12 calories per gram and a melting point of about 80° C.–180° C.

The difunctional sulfomonomer component of the polyester may advantageously be a dicarboxylic acid or a diester thereof containing a metal sulfonate group, a glycol containing a metal sulfonate group, or a hydroxy acid containing a metal sulfonate group. The metal ion of the sulfonate salt may be Na⁺, Li⁺, K⁺, Mg⁺⁺, Ca⁺⁺, Cu⁺⁺, Ni⁺⁺, Fe⁺⁺, Fe⁺⁺⁺, and the like.

Preferably, the difunctional sulfomonomer is dimethyl 5-sodiosulfoisophthalate or sodiosulfoisophthalic acid. Difunctional sulfomonomers are known in the art and are described in U.S. Pat. No. 3,779,993, the disclosure of which is incorporated herein by reference.

The other dicarboxylic acid component(s) of the polyester may consist of aliphatic, alicyclic, aromatic dicarboxylic acids having 2–20 carbon atoms, or mixtures of two or more of these acids. Examples of such dicarboxylic acids include succinic, glutaric, adipic, azelaic, sebacic, 1,4-cyclohexanedicarboxylic, 1,3-cyclohexanedicarboxylic, terephthalic, isophthalic, and the like.

The glycol component of the polyester may consist of aliphatic and alicyclic glycols as well as selected poly(ethylene glycols) having 2–12 carbon atoms. Examples of such glycols include diethylene glycol, triethylene glycol, ethylene glycol, propylene glycol, 1,3-propanediol, 1,3-butanediol, 1,4-butanediol, 1,5-pentanediol, 1,6-hexanediol, 1,3-cyclohexanedimethanol, 1,4-cyclohexanedimethanol, and the like.

The copolyesters are readily prepared using typical polycondensation techniques well known in the art. Typical polyesterification catalysts which may be used include titanium alkoxides, dibutyl tin dilaurate, and combinations of zinc, manganese, or magnesium acetates or benzoates with antimony oxides or antimony triacetate.

Useful polymers may have I.V. values ranging from about 0.4 to about 1.2 with preferred polymers having I.V. values ranging from about 0.5 to 1.1. The polymers are also crystallizable and generally have heats of fusion ($\Delta H_f$) less than 12 calories/gram. The polymers generally have melting points measured by differential scanning calorimetry of 80° C. to about 180° C.

The polymers of this invention are useful as adhesives for bonding fabrics, plastics, woods, and metals. Of special interest is their ability to bond fabrics over a wider temperature range than is possible without the presence of the dimethyl 5-sodiosulfoisophthalate moiety. For example, it is possible to make fabric bonds at temperatures as low as 100° C. Also, good bond strengths are achieved at relatively high bonding temperatures, such as 175° C. This is unusual in that unmodified low-melting polyester adhesives provide fabric bonds with low bond strength at elevated bonding temperatures.

It is theorized that the modification with the difunctional sulfonate metal salt increases the melt viscosity of the adhesive which allows bonds to be made at a higher temperature without driving adhesive into the fabric pores. Above about 6 mol % of the sulfonate metal salt, the melt viscosity becomes too high to be useful in this invention. Another point of special interest is that higher bond strengths are obtained when bonding metal substrates using the polymers of this invention.

The following examples are submitted for a better understanding of the invention.

EXAMPLE 1

A typical copolyester prepared in accordance with this invention is as follows. A total of 63.1 g (0.325 mol) of dimethyl terephthalate, 7.4 g (0.025 m) dimethyl 5-sodiosulfoisophthalate, 24 g (0.15 m) dimethyl glutarate, 38.7 g (0.43 m) 1,4-butanediol, 60.4 g (0.57 m) diethylene glycol, 0.205 g (0.0025 mols) of sodium acetate, and 2.06 mL of n-butanol solution of titanium tetraisopropoxide which contains 0.0053 g Ti per mL is weighed into a 500 mL, single-neck, round-bottom flask equipped with a nitrogen inlet, stirrer, vacuum outlet, and a condensing flask. The flask is heated at 200° C. in a Belmont metal bath for 60 minutes and at 210° C. for 70 minutes with a nitrogen sweep over the reaction mixture. When the theoretical amount of methanol has distilled from the reaction mixture, the metal bath temperature is increased to 250° C. The flask is heated at 250°-260° C. at a reduced pressure of 0.5 to 0.1 mm of mercury for 35 minutes. The flask is then removed from the bath and is allowed to cool in a nitrogen atmosphere while the polyester crystallizes. The glass flask is broken and the chunks of polymer are granulated in a Wiley mill in the presence of liquid nitrogen. Sulfur analysis (X-ray method) indicates that the polymer contains 5 mol % of the 5-sodiosulfoisophthalic acid moiety. Gas chromatographic analyses on hydrolyzed samples of the polyester show that the polyester also contains the following mol % reaction residues: dimethyl terephthalate, 65 mol %; dimethyl glutarate, 30 mol %; 1,4-butanediol, 59.2 mol %; and diethylene glycol, 40.8 mol %. The copolyester has an inherent viscosity of 0.78 and a crystalline melting point of 92° C. (first cycle DSC data). The melt viscosity measured at 1.0 sec$^{-1}$ shear rate using the mechanical spectrometer is 58,000 poise at 200° C.

T-peel metal bonds are made as follows: cold-rolled steel (5-mil thickness) and aluminum (12-mil thickness) substrates (one inch by four inches) are washed with a 5% Alconox solution and are rinsed in acetone. The substrates are dried in air. These metal strips are placed on a 250° C. hot plate to preheat the metals. Adhesive granules are placed on the preheated metal strips and are spread out after melting with a wooden tongue depressor. A second metal strip is placed on top and excess adhesive is pressed out using a one inch by four inch piece of wood to provide a bonded area one inch by one and one-half inches. The T-peel strengths are reported as an average of three determinations per sample. The copolyester shows significant improvement in T-peel strength on cold-rolled steel and aluminum substrates when compared to a copolyester which does not contain the 5-sodiosulfoisophthalic acid moiety (Cold-rolled steel: 16.8 lb/in. versus 9.4 lb/in., aluminum 18.0 lb/in. versus 5.0 lb/in.)

T-peel fabric bonds are made as follows films (5–8 mil thickness) of the copolyesters are prepared by compression molding at 175°–180° C. using a Wabash hydraulic press. The films are cut into one-inch by four-inch pieces and bonds are made to four-inch by four-inch pieces of polyester/cotton fabric using the Sentinel heat sealer at four seconds dwell time, 15 psig jaw pressure, and bond temperatures of 120° C., 135° C., 150° C., and 160° C. The bonds are trimmed and cut into specimens (one inch by four inches) for testing purposes. T-peel strengths are reported as an average of three determinations per sample. At a bonding temperature of 120° C., a peel strength of 10.8 lb/in. is obtained. When bonded at 165° C., the peel strength of the fabric bonds is 24.6 lb/in. Thus, the copolyester is an excellent fabric adhesive which allows a wider range of bonding temperatures than the copolyester which does not contain the 5-sodiosulfoisophthalic acid moiety.

The copolyesters of this invention are prepared and tested by this procedure or a slight variation thereof.

EXAMPLES 2–4

Examples 2 through 4 in Table 1 are polyesters containing 65–70 mol % terephthalic acid, 30 mol % glutaric acid, and 0–5 mol % dimethyl 5-sodiosulfoisophthalic acid for the acid portion and 55 mol % 1,4-butanediol and 45 mol % diethylene glycol for the glycol portion. These examples show that the polymers with the dimethyl 5-sodiosulfoisophthalate modification are bondable to fabric over a wider range of bonding temperatures with good bond strength retention than polymers without the difunctional sulfonate metal salt. The examples also show that the polymers with the dimethyl 5-sodiosulfoisophthalate modification have increased peel strength on metal substrates. The melt viscosity at 200° C. increases from 2,700 poise to 58,000 poise as the difunctional sulfonate metal salt concentration is increased from 0 to 5 mol %. This observation lends support to the theory that melt viscosity increases and allows bonds to be made at higher temperatures without driving adhesive into the pores of the fabric.

EXAMPLES 5-7

Examples 5 through 7 in Table 1 are polyesters containing 95 to 100 mol % terephthalic acid and 0 to 5 mol % 5-sodiosulfoisophthalic acid for the acid portion and 80 mol % 1,6-hexanediol and 20 mol % 1,4-butanediol for the glycol portion. The polymer in Example 6 contains 2 mol % 5-sodiosulfoisophthalic acid moiety. It provides metal bonds with peel strengths of 6.1 lb/in. on cold-rolled steel and 5.9 lb/in. on aluminum. In fabric bonds, this polymer provides peel strengths ranging from 16.7 lb/in. (bonded at 120° C.) to 7.3 lb/in. (bonded at 165° C.).

The polymer in Example 7 contains 5 mol % of the 5-sodiosulfoisophthalic acid moiety. This polymer provides peel strengths of 15.4 lb/in. on cold-rolled steel and 9.3 lb/in. on aluminum. Peel strengths on fabric bonds are 3.1 lb/in. (bonded at 135° C.) and 11.2 lb/in. (bonded at 165° C.).

TABLE 1
Properties of Polyester Composition Modified with Dimethyl 5-Sodiosulfoisophthalate

| Example Number | Polyester Composition | Inherent Viscosity | Glass Transition Temp. (°C.) | Melting Point (°C.) | Heat of Fusion (cal/g) | Metal Bond T-peel Strength (lb/in.) Cold Rolled Steel Substrate | Aluminum Substrate |
|---|---|---|---|---|---|---|---|
| 2 | 70 mol % Terephthalic Acid<br>30 mol % Glutaric Acid<br>55 mol % 1,4-Butanediol<br>45 mol % Diethylene Glycol | 0.86 | 2.1 | 108.6 | 2.71 | 9.4 | 5.0 |
| 3 | 68 mol % Terephthalic Acid<br>30 mol % Glutaric Acid<br>2 mol % Dimethyl 5-sodiosulfoisophthalate<br>55 mol % 1,4-Butanediol<br>45 mol % Diethylene Glycol | 0.83 | 4.2 | 105.0 | 2.79 | 14.2 | 9.1 |
| 4 | 65 mol % Terephthalic Acid<br>30 mol % Glutaric Acid<br>5 mol % Dimethyl 5-sodiosulfoisophthalate<br>55 mol % 1,4-Butanediol<br>45 mol % Diethylene Glycol | 0.78 | 3.3 | 92.3 | 1.69 | 16.8 | 18.0 |
| 5 | 100 mol % Terephthalic acid<br>80 mol % 1,6-Hexanediol<br>20 mol % 1,4-Butanediol | 0.69 | 12.1 | 129.8 | 10.9 | 0.6 | 1.7 |
| 6 | 98 mol % Terephthalic Acid<br>2 mol % Dimethyl 5-Sodiosulfoisophthalate<br>80 mol % 1,6-Hexanediol<br>20 mol % 1,4-Butanediol | 0.76 | 16.8 | 128.4 | 8.71 | 6.1 | 5.9 |
| 7 | 95 mol % Terephthalic Acid<br>5 mol % Dimethyl 5-sodiosulfoisophthalate<br>80 mol % 1,6-Hexanediol<br>20 mol % 1,4-Butanediol | 0.72 | 17.8 | 125.3 | 6.48 | 15.4 | 9.3 |

| Example Number | Polyester Composition | Polyester/Cotton Fabric T-peel Strength (lb/in.) 120° C. Bond temp. | 135° C. Bond temp. | 150° C. Bond temp. | 165° C. Bond temp. | Melt Viscosity at 200° C. (Poise) (1.0 sec⁻¹) Shear Rate |
|---|---|---|---|---|---|---|
| 2 | 70 mol % Terephthalic Acid<br>30 mol % Glutaric Acid<br>55 mol % 1,4-Butanediol<br>45 mol % Diethylene Glycol | 18.5 | 16.4 | 13.3 | 7.0 | 2,700 |
| 3 | 68 mol % Terephthalic Acid<br>30 mol % Glutaric Acid<br>2 mol % Dimethyl 5-sodiosulfoisophthalate<br>55 mol % 1,4-Butanediol<br>45 mol % Diethylene Glycol | 19.0 | 23.0 | 19.9 | 14.4 | 13,000 |
| 4 | 65 mol % Terephthalic Acid<br>30 mol % Glutaric Acid<br>5 mol % Dimethyl 5-sodiosulfoisophthalate<br>55 mol % 1,4-Butanediol<br>45 mol % Diethylene Glycol | 10.8 | 20.7 | 23.1 | 24.6 | 58,000 |
| 5 | 100 mol % Terephthalic acid<br>80 mol % 1,6-Hexanediol<br>20 mol % 1,4-Butanediol | — | 20.7 | 12.8 | 6.4 | 1,500 |
| 6 | 98 mol % Terephthalic Acid<br>2 mol % Dimethyl 5-Sodiosulfoisophthalate<br>80 mol % 1,6-Hexanediol<br>20 mol % 1,4-Butanediol | — | 16.7 | 13.2 | 7.3 | 23,000 |
| 7 | 95 mol % Terephthalic Acid<br>5 mol % Dimethyl 5-sodiosulfoisophthalate<br>80 mol % 1,6-Hexanediol<br>20 mol % 1,4-Butanediol | — | 3.1 | 6.9 | 11.2 | 980,000 |

Whenever the term "inherent viscosity" (I.V.) is used in this application, it will be understood to refer to viscosity determinations made at 25° C. using 0.50 gram of polymer per 100 ml. of a solvent composed of 60 wt. % phenol and 40 wt. % tetrachloroethane.

The "melting point" ($T_m$) of the polymers described in this application are readily obtained with a Differental Scanning Calorimeter.

The "heat of fusion" $\Delta H_f$ of polymers is the amount of heat absorbed when crystallizable polymers are melted. $\Delta H_f$ values are readily obtained using Differential Scanning Calorimeters (Perkin-Elmer). For example, one method for determining $\Delta H_f$ is described in *Journal of Applied Polymer Science* 20, 1209 (1976). Measurement of $\Delta H_f$ is also described in DuPont Thermal Analysis Bulletin No. 900-8 (1965). Qualitatively it is possible to compare the degree of crystallinity of polymers by comparing their $\Delta H_f$ values.

The strength of the bonds is determined by the so-called "Peel Test" based on a modification (i.e., three test specimens) of the ASTM "T-Peel Test" set forth on pages 63 and 64 of the 1964 edition of the BOOK OF ASTM STANDARDS, published by the American Society of Testing Materials, and more specifically identified as Test Number D-1876-61-T.

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. A crystalline copolyester adhesive composition, the copolyester having repeat units from the following:
   (a) about 0.2–6 mol % of at least one difunctional sulfomonomer containing at least one metal sulfonate group attached to an aromatic nucleus wherein the functional groups are hydroxy or carboxy,
   (b) at least one dicarboxylic acid selected from the group consisting of aliphatic, alicyclic and aromatic dicarboxylic acids having 2–20 carbon atoms,
   (c) at least one glycol selected from the group consisting of aliphatic and alicyclic glycols having 2–12 carbon atoms,
   (d) at least one dicarboxylic acid different from (a) and (b), having 2–20 carbon atoms, or at least one glycol different from (a) and (c) having 2–12 carbon atoms,
   wherein the total of the acid and glycol components total 100 mol % each, and said copolyester having an I.V. of about 0.4–1.2, a heat of fusion of less than 12 calories per gram and a melting point of about 80° C.–180° C.

2. A copolyester adhesive composition according to claim 1 wherein said difunctional sulfomonomer is a dicarboxylic acid.

3. A copolyester adhesive composition according to claim 1 wherein said difunctional sulfomonomer is a glycol.

4. A copolyester adhesive composition according to claim 1 wherein said difunctional sulfomonomer is sodiosulfoisophthalic acid or a diester thereof.

5. A copolyester adhesive composition according to claim 1 wherein the dicarboxylic acid component comprises repeat units from terephthalic acid, sodiosulfoisophthalic acid and glutaric acid, and the glycol component comprises repeat units from 1,4-butanediol and diethylene glycol.

6. A copolyester adhesive composition according to claim 1 wherein the dicarboxylic acid component comprises repeat units from terephthalic acid and sodiosulfoisophthalic acid, and the glycol component comprises repeat units from 1,4-butanediol and 1,6-hexanediol.

7. A pair of substrates bonded together with the adhesive composition of claim 1.

* * * * *